(12) United States Patent
Kim et al.

(10) Patent No.: US 10,106,417 B2
(45) Date of Patent: Oct. 23, 2018

(54) METHOD OF MANUFACTURING GRAPHENE USING DOPED CARBON MATERIALS

(71) Applicant: KOREA ADVANCED INSTITUTE OF SCIENCE AND TECHNOLOGY, Daejeon (KR)

(72) Inventors: Sang Ouk Kim, Daejeon (KR); Joonwon Lim, Daejeon (KR); Ho Jin Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/393,192

(22) Filed: Dec. 28, 2016

(65) Prior Publication Data
US 2017/0190580 A1    Jul. 6, 2017

(30) Foreign Application Priority Data

Dec. 30, 2015 (KR) .......... 10-2015-0189225
Nov. 10, 2016 (KR) .......... 10-2016-0149475

(51) Int. Cl.
*C01B 31/04* (2006.01)
*C01B 32/23* (2017.01)
*C01B 32/184* (2017.01)

(52) U.S. Cl.
CPC .......... *C01B 31/043* (2013.01); *C01B 32/184* (2017.08); *C01B 32/23* (2017.08)

(58) Field of Classification Search
CPC ...... C01B 31/043; C01B 32/23; C01B 32/184
USPC .......................................... 549/518; 423/448
See application file for complete search history.

(56) References Cited

FOREIGN PATENT DOCUMENTS

| KR | 1020110050523 A | 5/2011 |
|---|---|---|
| KR | 1020120099910 A | 9/2012 |

OTHER PUBLICATIONS

Elias et al, Logngitudinal Cutting of Pure and Doped Carbon Nanotubes to Form Graphitic Nanoribbbons Using Metal Clusters as Nanoscalpels, Nano Letters, 2010, 10, p. 366-372. (Year: 2010).*
Dong et al, Oxidative Unzipping of stacked Nitrogen-Doped Carbon Nanotube Cups, ACS Applied Materials & Interfaces, May 6, 2015, 7, p. 10734-10741. (Year: 2015).*
Shinde et al, Electrochemical Unzipping of Multi-walled Carbon Nanotubes for Facile synthesis of High-Quality Graphene Nanoribbons, J. Am. Soc. ,2011, 133, p. 4168-4171. (Year: 2011).*
Terrones et al, Graphenen and Graphite nanaoribbons: Morphology, properties, synthesis, defects,and applications, Nano Today, 2010,5, p. 351-372. (Year: 2010).*
Zhu, Y. et al., "Carbon-Based Supercapacitors Produced by Activation of Graphene," Science, vol. 332, No. 6037, Jun. 24, 2011, 5 pages.

* cited by examiner

*Primary Examiner* — Taylor V Oh
(74) *Attorney, Agent, or Firm* — McCoy Russell LLP

(57) ABSTRACT

Provided is a method of manufacturing graphene by unzipping doped carbon materials by an external stimulus and a graphene manufactured therefrom.

12 Claims, 17 Drawing Sheets

METHOD OF MANUFACTURING GRAPHENE USING DOPED CARBON MATERIALS

CROSS-REFERENCE TO RELATED APPLICATIONS

This application claims priority under 35 U.S.C. § 119 to Korean Patent Application No. 10-2015-0189225, filed on Dec. 30, 2015, and Korean Patent Application No. 10-2016-0149475, filed on Nov. 10, 2016, in the Korean Intellectual Property Office. The entire contents of each of which are incorporated herein by reference in their entirety for all purposes.

TECHNICAL FIELD

The following disclosure relates to a method of manufacturing graphene using doped carbon materials, and more particularly, to a method of manufacturing graphene of which borders are introduced with a specific kind of functional groups and graphene manufactured therefrom.

BACKGROUND

As low-dimensional nano materials composed of carbon atoms, there are fullerene, carbon nanotube, graphene, graphite, or the like. That is, the low-dimensional nano materials may be classified into the fullerene having a 0-dimensional structure if the carbon atoms have a ball shape while having a hexagonal arrangement, the carbon nanotube if the carbon atoms are rolled one-dimensionally, the graphene if a layer consists of carbon atoms in two dimension, and the graphite if the carbon atoms are accumulated three-dimensionally.

In particular, the graphene is a material that has excellent conductivity as well as is very stable and excellent in electrical, mechanical, and chemical properties and may move electrons 100 times as fast as silicon and move a current about 100 times larger than copper, which was proved by an experiment since a method of separating graphene from graphite is discovered in 2004. Many studies have been conducted up to now.

Further, the graphene has high thermal conductivity (~5000 $Wm^{-1} K^{-1}$), excellent mobility of a charge carrier (200,000 $cm^2 V^{-1}s^{-1}$), a large specific surface area (2,630 $m^2g^{-1}$), and excellent mechanical stability. Thanks to the excellent properties, the graphene has been attracting much attention since first discovery of 2004 and many studies for applying the graphene to various fields such as field effect transistor (FET), supercapacitor, hydrogen generation/storage, solar cell, photocatalyst, and biosensor have been intensively conducted.

To manufacture the graphene, various methods have been known. For example, as various methods, there are a method of delaminating an adhesive tape of an individual graphene layer from graphite, a method of chemically delaminating a graphene layer from graphite, and a chemical deposition method each of which provides approximately a pico gram amount of graphene. Further, some lithography and synthesis procedures have been developed to manufacture an ultra small quantity of graphene nanoribbon.

As other methods, a method of manufacturing a microscopic quantity of graphene nanoribbon by partially encapsulating carbon nanotube among polymers and longitudinally cutting the carbon nanotube by performing plasma etching and a method of manufacturing graphene nanoribbon by adding multi-walled carbon nanotube (MWNT) to a liquid ammonia solvent and causing delamination by interaction and reaction of the MWNT with lithium to non-selectively open the MWNT in a longitudinal direction have been known.

However, when manufacturing the graphene, the method has a fundamental problem in that it is difficult to obtain a material having a size fitting for a use purpose or a uniform size and make a structure of both ends or corners of 2D uniform, or change a material to be fitted for a purpose. In particular, the graphene heat treated by an activation treating process using potassium hydroxide has been reported that it has a high specific surface area (3100/g) but affects a 2D structure that is unique properties of the graphene (*Carbon-Based Supercapacitors Produced by Activation of Graphene*, Yanwu Zhu et al., *Science* 332, 1537 (2011)) and when the carbon nanotube is open in a longitudinal direction by using permanganate, oxygen of a graphene edge has to suffer from reduction processing with hydrazine but the graphene is harmful to a human body due to toxicity of the hydrazine, and has reduced electronic characteristics due to oxidized defects.

Further, to apply the graphene to various functional elements, a doping process capable of improving electrical characteristics such as face resistance of the graphene and charge mobility is essential but the foregoing methods have to add a separate doping process to a deposition device, or the like, and therefore require a long process time and consume much time and costs for the processing process.

RELATED ART DOCUMENT

Patent Document

Korean Patent Laid-Open Publication No. 10-2011-0050523 (May 13, 2011)

Korean Patent Laid-Open Publication No. 10-2012-0099910 (Sep. 12, 2012)

NON-PATENT DOCUMENT

Carbon-Based Supercapacitors Produced by Activation of Graphene, Yanwu Zhu et al., Science 332, 1537 (2011)

SUMMARY

An embodiment of the present invention is directed to providing a method of manufacturing a graphene-based nano structure doped with hetero atoms without changing a graphene structure by unzipping doped carbon materials. The method may not manufacture typical graphene but manufacture graphene of which borders are introduced with carbonyl, and may easily manufacture a functional graphene derivative using the introduced carbonyl without changing a graphene chemical structure.

Another embodiment of the present invention is directed to providing a method of manufacturing graphene capable of progressing a selective unzipping phenomenon of doped carbon materials using relatively low electrochemical potential.

Still another embodiment of the present invention is directed to providing a method of manufacturing graphene capable of progressing a selective unzipping phenomenon of doped carbon materials using a physical external stimulus.

In one general aspect, there is provided a method of manufacturing graphene by unzipping doped carbon materials by an external stimulus.

The external stimulus may be at least any one or two selected from a physical external stimulus and a chemical external stimulus.

The physical external stimulus may be at least any one or two selected from a sound wave, light energy, electric energy, an external pressure, and an external tension.

The method may include: applying the physical external stimulus to the doped carbon materials.

The method may include: a) transferring the doped carbon materials to an electrode and then heat-treating the electrode to attach the doped carbon materials to the electrode; and b) putting the electrode, to which the doped carbon materials are attached, in an electrolyte including an oxidizer and applying a voltage to the electrode to perform an oxidation reaction.

The method may include: a) transferring the doped carbon materials to an electrode and then heat-treating the electrode to attach the doped carbon materials to the electrode; and b) putting the electrode, to which the doped carbon materials are attached, in an electrolyte including an oxidizer and applying a voltage to the electrode to perform an oxidation reaction; and c) applying a physical external stimulus to the oxidized carbon materials.

The oxidizer may be at least any one or two selected from sulfuric acid, nitric acid, phosphoric acid, hydrochloric acid, hydrofluoric acid, salts thereof, and an aqueous solution thereof.

The oxidizer may be sulfuric acid or sulfuric acid solution.

A concentration of the sulfuric acid solution may range from 0.001 to 10 M.

The voltage may range from 0.01 to 5.0 V.

The method may include: i) depositing a metal catalyst on a substrate; ii) growing the doped carbon materials on the metal catalyst; and iii) etching the substrate with an etchant to separate the doped carbon materials.

The doped carbon materials may be doped with a hetero atom of at least any one selected from nitrogen, phosphorus, arsenic, antimony, bismuth, boron, aluminum, gallium, indium and thallium.

The hetero atom doped on the doped carbon materials may be coordinately bonded to at least one metal element.

The metal element may be at least any one or two selected from Fe, Ni, Cu, W, V, Cr, Sn, Co, Mn, Mo, Mg, Al, Si, Zr, Ti, Ru, Pt, Ag, Au, Pd, Rh, Ir, Ta, Nb, Zn, and Cd.

The doped carbon materials may be doped at an element ratio that is 0.001 to 10% of hetero atom with respect to the entire carbon atom.

The doped carbon materials may be at least any one or two selected from single-walled carbon nanotube, double-walled carbon nanotube, triple-walled carbon nanotube, multi-walled carbon nanotube, and superfine carbon nanotube.

In another general aspect, there is provided a graphene manufactured by unzipping doped carbon materials by an external stimulus and having an edge formed with carbonyl.

The graphene may satisfy the following Formulas 2 to 5 in C1s spectrum obtained by an X-ray photoelectron spectroscopy (XPS).

$$0.01 \leq X_2/X_1 \leq 0.15 \quad \text{[Formula 2]}$$

$$0.01 \leq X_3/X_1 \leq 0.2 \quad \text{[Formula 3]}$$

$$0.01 \leq X_4/X_1 \leq 0.1 \quad \text{[Formula 4]}$$

$$0.5 \leq X_3/X_2 \leq 1{,}000 \quad \text{[Formula 5]}$$

(In the above Formulas 2 to 5, $X_1$ represents a peak area of carbon-carbon double bonding, $X_2$ represents a peak area of carbon-oxygen single bonding, $X_3$ represents a peak area of carbon-oxygen double bonding, and $X_4$ represents a peak area of a carboxyl.)

Exemplary embodiments described above are not limited to contents described above, but include all contents that may be easily changed by those skilled in the art. As an example, there may be a case of using another type of apparatus in order to execute the same technology.

BRIEF DESCRIPTION OF THE DRAWINGS

FIGS. 4A and 4B are diagrams illustrating spectrum measured by X-ray photoelectron spectroscopy before and after the unzipping phenomenon of the multi-walled carbon nanotube doped with nitrogen according to the exemplary embodiment of the present invention, in which FIG. 4A illustrates the XPS spectrum before and after an unzipping phenomenon of N1s and FIG. 4B illustrates the XPS spectrum before and after an unzipping phenomenon of Fe2p, and FIG. 4A illustrates nitrogen 1s bond energy (left) of nitrogen-doped carbon nanotube (NCNT) and nitrogen 1s bond energy (right) after unzipping and FIG. 4B illustrates iron 2p bond energy (left) of the nitrogen-doped carbon nanotube (NCNT) and iron 2p bond energy (right) after unzipping.

FIGS. 7A, 7B and 7C illustrate physical properties of the multi-walled carbon nanotube doped with nitrogen according to the exemplary embodiment of the present invention, in which FIG. 7A illustrates TEM of the multi-walled carbon nanotube doped with nitrogen over time, FIG. 7B illustrates a concentration of nitrogen and a content of an oxygen functional group having a pyridine form of the multi-walled carbon nanotube doped with nitrogen according to the exemplary embodiment of the present invention, and FIG. 7C illustrates a capacitive current of the multi-walled carbon nanotube doped with nitrogen over time.

DETAILED DESCRIPTION OF EMBODIMENTS

Figure 1:
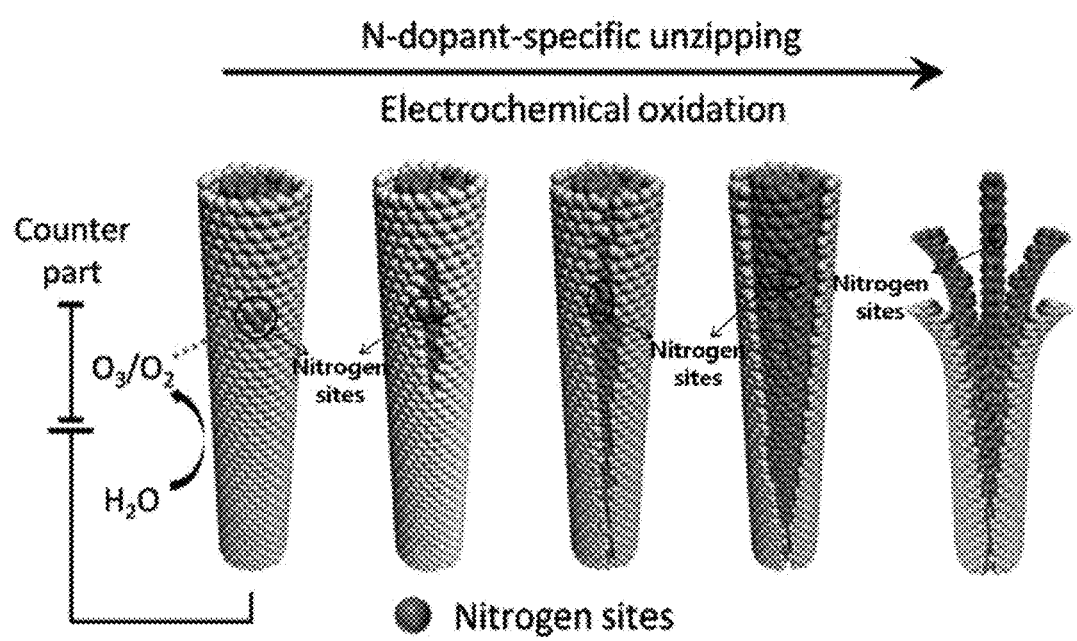
FIG. 1 is a diagram illustrating an unzipping phenomenon of multi-walled carbon nanotube doped with nitrogen according to an exemplary embodiment of the present invention.

Hereinafter, a method of manufacturing graphene having a hetero structure according to an exemplary embodiment of the present invention will be described with reference to the accompanying drawings and detailed examples. However, the following detailed examples or embodiments are only referenced for describing in detail the present invention and therefore the present invention is not limited thereto and may be variously implemented.

Further, unless differently defined, all technical terms and scientific terms have the same meanings as meanings generally understood by a person having ordinary skill in the art to which the present invention pertains. Terms used for descriptions herein are to effectively describe only specific detailed examples and are not intended to limit the present invention.

Further, the following introduced drawings are provided by way of example so that the idea of the present invention can be sufficiently transferred to those skilled in the art to which the present invention pertains. Therefore, the present invention is not limited to the accompanying drawings provided below, but may be modified in many different forms. In addition, the accompanying drawings suggested below will be exaggerated in order to clear the spirit and scope of the present invention. In addition, like reference numerals denote like elements throughout the specification.

Further, a singular form used in the specification and the accompanying claims may be intended as including a plural form unless specifically indicated.

In addition, in describing components the present invention, terms such as first, second, A, B, (a), (b), etc. can be used. These terms are used only to differentiate the components from other components. Therefore, the nature, times, sequence, etc. of the corresponding components are not limited by these terms. When any components are "connected", "coupled", or "linked" to other components, it is to be noted that the components may be directly connected or linked to other components, but the components may also be "connected", "coupled", or "linked" to other components via another component therebetween.

Throughout the present specification, unless explicitly described to the contrary, "comprising" any components will be understood to imply the inclusion of other elements rather than the exclusion of any other elements.

According to an exemplary embodiment of the present invention, a hetero atom is the general term for all atoms other than carbon or hydrogen. For example, in pyridine that is a heterocyclic compound, the hetero atom is nitrogen.

In the exemplary embodiment of the present invention, the term "doped" means that at least one of carbon atoms forming a carbon structure is replaced by the hetero atom.

In the exemplary embodiment of the present invention, the term 'carbon material' is a material that is partially or wholly composed of the carbon atoms and may include carbon fiber, carbon black, activated carbon, artificial graphite, graphene, and carbon nanotube.

In the exemplary embodiment of the present invention, the term 'carbon nanotube' means a structure in which a honeycomb layer of at least one layer in which carbon is configured by $sp^2$ bonding is formed in a cylindrical shape.

In the exemplary embodiment of the present invention, the term 'graphene' means a two-dimensional plane consisting of one or more honeycomb layer in which carbon is configured only by $sp^2$ bonding.

In the exemplary embodiment of the present invention, the term 'edge' means an edge of the graphene generated by an oxidation reaction of a carbon material, in detail, means a portion located at a border of a surface portion of the graphene.

The present invention provides a method of manufacturing graphene by unzipping doped carbon materials by an external stimulus. That is, the carbon materials may be unzipped by applying the external stimulus to the doped carbon materials, thereby manufacturing the graphene having a 2D structure.

The graphene manufactured by the foregoing method may have a hetero structure unfolded in the form in which it encloses the carbon materials, in more detail, the carbon nanotube (CNT) core to maintain the complete two-dimensional crystallinity, may maintain borders of the unfolded graphene well without a physical or chemical damage, and may not generate unnecessary oxygen functional groups such as epoxy, hydroxy, and carboxy to maintain electric conductivity higher than that of the graphene nanoribbon of the existing manufacturing method.

Further, the graphene manufactured according to the exemplary embodiment of the present invention may have a structure of a heterogeneous structure of graphene/carbon nanotube and graphene nanoribbon/carbon nanotube, thereby satisfying both of an excellent specific surface area that is an advantage of the graphene and high electric conductivity that is an advantage of the carbon nanotube.

In addition, the method according to the exemplary embodiment of the present invention may not manufacture graphene having a typical structure but manufacture the graphene of which borders are introduced with carbonyl, and may easily manufacture a functional graphene derivative using the introduced carbonyl without changing a graphene chemical structure.

As such, when the graphene is manufactured by applying the external stimulus to the doped carbon materials, the carbon materials are easily unzipped without the physical or chemical damage, thereby manufacturing the excellent quality of graphene having the hetero structure.

At this point, the external stimulus may be at least any one or two selected from the physical external stimulus and the chemical external stimulus. That is, the doped carbon materials may be unzipped by being applied with only the physical external stimulus, only the chemical external stimulus, or both of the physical external stimulus and the chemical external stimulus.

It is preferable that the doped carbon materials may be unzipped by being applied with both of the physical external stimulus and the chemical external stimulus. The reason is that when the carbon materials have defects due to the chemical external stimulus and then the carbon materials are applied with the physical external stimulus, the chemical damage that may occur due to the chemical external stimulus and the physical damage that may occur due to the physical external stimulus may be minimized to manufacture the graphene having excellent crystallinity. In addition, compared to the case of using the chemical external stimulus, the carbon materials may be unzipped longer, thereby improving the unzipping efficiency. At this time, the term 'longer' means that the unzipped length of the doped carbon materials is relatively longer compared to the case of using only the chemical external stimulus.

The exemplary embodiment of the present invention may use any method of unzipping carbon materials by applying a physical force to the carbon materials by a physical external stimulus without a special limitation. In detail, an example of the physical external stimulus may include any one or two selected from a sound wave, light energy, electric energy, external pressure, external tension, and so on. The chemical external stimulus may use any method of unzipping carbon materials by applying a chemical force to the carbon materials without a special limitation. In detail, an example of the method may include an electricity applying method.

Hereinafter, a method of unzipping doped carbon materials by applying an external stimulus to the doped carbon materials will be described in more detail.

According to the exemplary embodiment of the present invention, the graphene may be manufactured by applying only the physical external stimulus to the doped carbon materials. That is, the doped carbon materials may be unzipped by being applied with the physical external stimuli of at least any one or two selected from the sound wave, the light energy, the electric energy, the external pressure, the external tension, and so on.

As one detailed example, when unzipped by the sound wave, the doped carbon materials are put in a dispersion medium to be dispersed and then are applied with sonication, such that the doped carbon materials may be unzipped. At this point, the sonication may be applied at output strength that is equal to or more than 10 W, more preferably, output strength between 10 and 50 W. When the output strength is too weak, the intensity of the sonication is too weak and thus the carbon materials may not be unzipped even for a long period of time and when the intensity of the sonication is too strong, the physical damage of the carbon materials may be severe. Meanwhile, with respect to the output strength of 20 W, sonication processing time may be 10 minutes to 6 hours, more preferably, 30 minutes to 180 minutes. When the sonication processing time is too short, the carbon materials may not sufficiently be unzipped and when the sonication processing time is long, the graphene may be physically damaged.

At this time, the dispersion medium may disperse the doped carbon materials well and as long as the dispersion medium does not cause the physical or chemical damage, any dispersion medium may be used without a special limitation. As one detailed example, the dispersion medium may be at least any one or two selected from water such as distilled water and purified water; alcohol-based solvents such as methanol, ethanol, methoxyethanol, propanol, isopropanol, butanol and isobutanol; ketone-based solvents such as acetone, methyl ethyl ketone and methyl isobutyl ketone; ester-based solvents such as ethyl acetate, butyl acetate and 3-methoxy-3-methylbutyl acetate; amine-based solvents such as dimethylformamide, methylpyrrolidone and dimethylacetamide; ether-based solvents such as tetrahydrofuran, 2-methyltetrahydrofuran, dimethyl ether and dibutyl ether, or the like, but is not limited thereto.

Further, according to the exemplary embodiment of the present invention, the graphene may be manufactured by applying only the chemical external stimulus to the doped carbon materials. In this case, the method of manufacturing graphene may include: a) transferring doped carbon materials to an electrode and then heat-treating the electrode to attach the doped carbon materials to the electrode; and b) putting the electrode, to which the doped carbon materials are attached, in an electrolyte including an oxidizer and applying a voltage to the electrode to perform an oxidation reaction.

As such, the oxidation reaction is performed by the reaction with the oxidizer, thereby manufacturing the graphene having the hetero structure without the physical damage.

Further, according to the exemplary embodiment of the present invention, as described above, the graphene may be manufactured by applying both of the chemical external stimulus and the physical external stimulus to the doped carbon materials. In this case, the method of manufacturing graphene may include: a) transferring doped carbon materials to an electrode and then heat-treating the electrode to attach the doped carbon materials to the electrode; b) putting the electrode, to which the doped carbon materials are attached, in an electrolytic solution including an oxidizer and applying a voltage to the electrode to perform an oxidation reaction; and c) applying a physical external stimulus to the oxidized carbon materials.

That is, the same method as the method of applying only a chemical external stimulus performs up to the oxidation reaction and then the same method as the method of applying only a physical external stimulus additionally applies the physical stimulus, thereby more effectively unzipping the carbon materials.

As described above, when the carbon materials have defects due to the chemical external stimulus and then the carbon materials are applied with the physical external stimulus, the chemical damage that may occur due to the chemical external stimulus and the physical damage that may occur due to the physical external stimulus may be minimized to manufacture the graphene having excellent crystallinity In addition, compared to the case of using the chemical external stimulus, the carbon materials may be unzipped longer, thereby improving the unzipping efficiency.

First, in each step, a) the transferring of the doped carbon materials to the electrode and then heat-treating the electrode to attach the doped carbon materials to the electrode will be described.

The present step is a step of attaching the doped carbon materials to the electrode to perform the subsequent oxidation reaction, thereby improving the physical and electrical adhesion between the doped carbon materials and the electrode by the heat treatment. According to the exemplary embodiment of the present invention, the heat-treatment temperature and time are not limited but preferably, the heat treating may be performed at a temperature of 40 to 70° C. for 1 to 24 hours.

At this time, the electrode may be, for example, a glassy carbon electrode, metal such as platinum (Pt) and gold (Au), or glass coated with indium tin oxide, and so on that are generally used in the art.

According to the exemplary embodiment of the present invention, the transferring method is not specifically limited but may transfer the doped carbon materials to the electrode while putting the electrode in an etchant including the doped carbon materials. The etchant is a substrate etchant used at the time of manufacturing the doped carbon materials and sonication may be performed prior to dipping the substrate into the etchant to appropriately disperse the doped carbon materials.

Next, b) the step of putting the electrode, to which the doped carbon materials are attached, in the electrolytic solution including the oxidizer and applying a voltage to the electrode to perform the oxidation reaction will be described.

The present step is a step of forming defects on the doped carbon materials and unzipping the carbon materials, beginning with the defects.

According to the exemplary embodiment of the present invention, the oxidizer is to drop the doped metal elements, that is, the dopant out of the doped carbon materials and initiate the oxidation reaction of the doped carbon materials. Describing in more detail this, the oxidizer changes the electrolyte to an acidic state, substitutes proton for metal elements that are coordinately bonded to doped hetero atoms under the acidic electrolyte environment as described below, and thus the oxidation reaction of the carbon materials is performed.

For example, describing in more detail it, nitrogen is doped in a porphyrin form and in the carbon materials in which the nitrogen is coordinately bonded to iron, iron ($Fe^{2+}$) forming $FeN_4$ under the acidic atmosphere may be substituted with proton ($2H^+$) and the proton promotes the oxidation reaction of the carbon materials. At this time, Gibbs free energy $\Delta G$ depending on a density functional theory (DFT) is represented by the following Formula 1.

$$\Delta G = E(N_4H_2) + \mu^{exp}(Fe^{2+}) - E(FeN_4) - 2\mu^{exp}(H^+) = -1.86 \text{ eV} - 2\mu^{exp}(H^+) \quad \text{[Formula 1]}$$

In the above Formula 1, E represents the entire energy of DFT and $\mu^{exp}$ represents empirically measured chemical potential. Here, chemical potential of hydrogen is diverse from 0 (pH=1) to −0.83 (pH=14) depending on pH, and therefore the lower the pH, the lower the entire energy of the DFT, and therefore an extraction of iron is promoted, such that the unzipping phenomenon of the carbon materials may be naturally performed.

Figure 3:
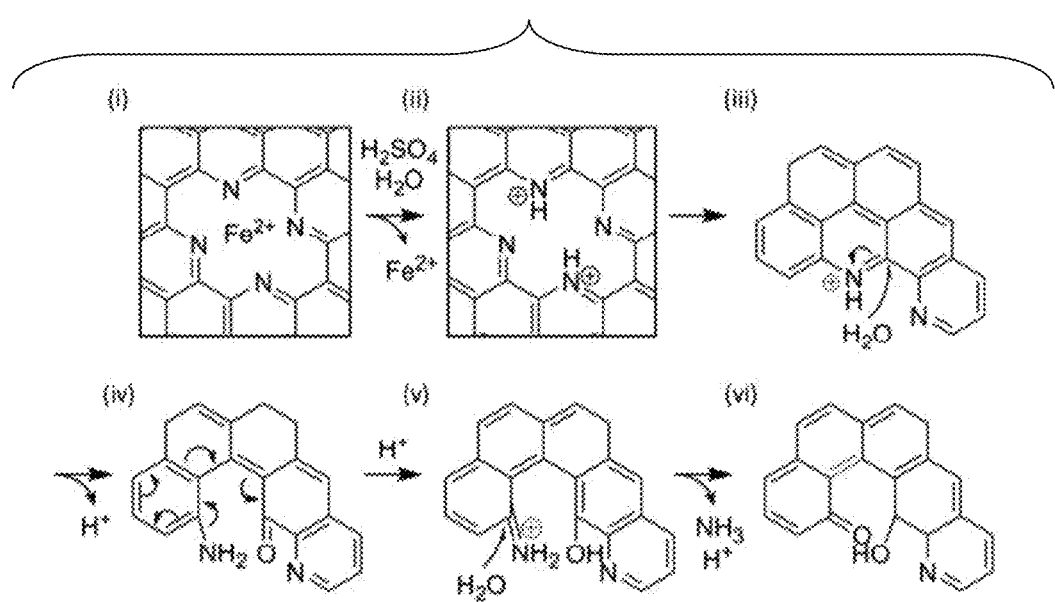
FIG. 3 is a diagram illustrating, in a structural formula, the unzipping phenomenon of the multi-walled carbon nanotube doped with nitrogen according to the exemplary embodiment of the present invention.

Further, as illustrated in FIG. 3, as the concentration of the proton around the carbon materials is increased under the acidic environment, the oxidation reaction of the carbon materials is performed, such that the unzipping phenomenon of the carbon materials may be accelerated. The reason is that the proton is to perform a catalyst role in the oxidation reaction of the carbon materials.

According to the exemplary embodiment of the present invention, the oxidizer may include inorganic acids, organic acids, or a mixture thereof, and as the non-limited one detailed example, the oxidizer may be at least any one or two selected from sulfuric acid, nitric acid, phosphoric acid, hydrochloric acid, hydrofluoric acid, salts thereof, an aqueous solution thereof, or the like. The salt may be metal salt of the inorganic acid such as lithium chloride.

According to the exemplary embodiment of the present invention, the oxidizer may be, preferably, sulfuric acid or sulfuric acid solution, most preferably, sulfuric acid solution. When the oxidizer is the sulfuric acid solution, the oxidizer may have a concentration of 0.001 to 10 M which makes the oxidation reaction initiation effect excellent.

According to the exemplary embodiment of the present invention, applying a voltage is to accelerate the unzipping of the carbon materials, starting the defects, in which a voltage of 0.01 to 5.0 V, more preferably, a voltage of 0.5 to 1.0 V may be applied to perform the reaction of 30 minutes or more, more preferably, 8 hours or more and an upper bound of the voltage applying time is not particularly limited but may be equal to or less than 48 hours. This is to suggest the conditions for the case of unzipping the doped carbon materials by applying only the chemical external stimulus to the doped carbon materials and in the case of unzipping the doped carbon materials using both of the chemical external stimulus and the physical external stimulus, the voltage applying time and conditions may be different from the foregoing. That is, compared to the case of unzipping the doped carbon materials using only the chemical external stimulus, in the case of unzipping the doped carbon materials using both of the chemical external stimulus and the physical external stimulus, the additional external stimulus is applied, and therefore the voltage applying time is short or the voltage intensity is weak to perform the step b). According to one detailed example, the oxidation reaction may be performed for the voltage applying time of 10 minutes or more based on the same voltage intensity, preferably, the voltage applying time of 30 minutes to 24 hours, more preferably, 1 hour to 6 hours.

Further, prior to performing the step b), that is, prior to applying the voltage, the electrolyte may be charged with gas. In this case, the charging time is not limited in the present invention, but is preferably 10 minutes or more. The charged gas is not also limited in the present invention, but it is preferable to charge inert gas, in detail, pure nitrogen gas.

Further, in the present invention, the step b) is not particularly limited, but is preferably performed in a 3-electrode system. At this time, as a counter electrode, a platinum wire is preferably used, and as a reference electrode, saturated mercury/mercury (II) sulfate is preferably used.

The graphene unzipped from the doped carbon materials may be manufactured by the foregoing method but the graphene unzipped longer may be manufactured by additionally applying the physical external stimulus.

At this time, the method of applying a physical external stimulus is the same as the foregoing. Again describing the present method, the physical external stimulus may be applied to the carbon material oxidized by the step b) to improve the unzipping efficiency.

That is, the oxidized doped carbon materials may be unzipped by being applied with the physical external stimuli of at least any one or two selected from the sound wave, the light energy, the electric energy, the external pressure, the external tension, and so on. Therefore, it is possible to effectively unzip the doped carbon materials within the lower output strength or the shorter time than the case in which the carbon materials are unzipped by only the physical external stimulus.

As one detailed example, when the unzipping is performed by the sound wave, the electrode to which the oxidized carbon materials are attached may be put in the electrolyte to be sonicated or put in the treating fluid to be sonicated. At this point, the treating fluid may be one selected from the foregoing dispersion medium.

As one detailed example, the sonication may be applied at the output strength that is equal to or more than 5 W, more preferably, the output strength between 5 and 50 W. When the output strength is too weak, the intensity of the sonication is too weak and thus the carbon materials may not be unzipped even for a long period of time and when the intensity of the sonication is too strong, the physical damage of the graphene may be severe. Meanwhile, with respect to the output strength of 10 W, sonication processing time may be 1 minute to 6 hours, more preferably, 1 minute to 60 minutes. When the sonication processing time is too short, the carbon materials may not sufficiently be unzipped and when the sonication processing time is long, the graphene may be physically damaged.

Meanwhile, the method of manufacturing doped carbon materials according to the present invention is not limited but the carbon material may be manufactured by the following method.

According to the exemplary embodiment of the present invention, the carbon materials are a material partially or wholly including carbon atoms as the foregoing definition and may be at least any one or two selected from, for example, carbon fiber, carbon black, activated carbon, artificial graphite, graphene, and carbon nanotube, more preferably, carbon nanotube or graphene.

In particular, a method of manufacturing carbon nanotube among the doped carbon materials is not limited in the present invention, but for example, the manufacturing method of Korean Patent Laid-Open Publication No. 10-2010-0131651 may be applied.

In detail, the method of manufacturing doped carbon materials may include i) depositing a metal catalyst on a substrate; ii) growing the doped carbon materials on the metal catalyst; and iii) etching the substrate with an etchant to separate the doped carbon materials.

Describing in more detail this, the step i) is a previous step for growing the carbon materials and may form block copolymer nanotemplate on the substrate and then deposit the metal catalyst while controlling a deposition angle.

According to the exemplary embodiment of the present invention, any block copolymer that may easily grow the carbon materials may be used in the present invention without being limited, but any form of block copolymer in which monomer blocks having at least two different structures or natures are bonded as one polymer may be used irrespective of kind.

The block copolymer is not limited in the present invention but may be a copolymer in which at least one hydrophilic monomer block and at least one hydrophobic monomer block are polymerized with each other. Alternatively, the block copolymer may be a form in which at least one aromatic monomer is polymerized with an acrylate monomer and an alkylene glycol monomer.

In more detail, the block copolymer is mainly a binary system block copolymer and may include PS-b-PMMA, [polystyrene-blockpoly(methylmethacrylate)], PS-b-PEO [polystyrene-block-poly(ethylene oxide)], PS-b-PVP [polystyrene-block-poly(vinyl pyridine)], PS-b-PEP [Polystyreneblock-poly(ethylene-alt-propylene)], PS-b-PI [polystyrene-blockpolyisoprene], or the like.

According to the exemplary embodiment of the present invention, the nanotemplate may form by forming a block copolymer film, annealing the block copolymer film, and then performing wet etching or UV irradiation on the block copolymer block, or the like.

According to the exemplary embodiment of the present invention, the metal catalyst is not limited in the present invention but may be selected from a group consisting of iron (Fe), nickel (Ni), cobalt (Co), and a mixture thereof. Further, a deposition method is also not limited but a vacuum deposition method may be performed.

Next, like the step ii), the step of growing doped carbon materials on a metal catalyst may be performed. However, prior to performing the step ii), the patterned metal catalyst array may be first formed by removing the nanotemplate.

The removal of the nanotemplate is not limited in the present invention, but may be performed using toluene sonication under the atmosphere in which the solvent is present or is not present. At this time, any organic solvent that is block copolymer-friendly may be used irrespective of kind, and for example, aromatic organic solvents such as toluene, xylene, trichlorobenzene, and nitrobenzene and aromatic or common organic solvents such as water, acetic acid, acetonitrile, methanol, and ethanol may be used. Further, to form the metal catalyst having a uniform form, the heat treatment may be performed at 550 to 650° C.

According to the exemplary embodiment of the present invention, the growth of the doped carbon materials may be made by synthesis methods generally used in the art such as arc discharge, laser ablation, and chemical vapor deposition (CVD). In particular, it is preferable to apply plasma-enhanced chemical vapor deposition (PECVD) to easily control a density of hetero atom doped on the carbon materials.

In one detailed example, when the plasma-enhanced chemical vapor deposition is applied, a hydrogen plasma processing process of fracturing the metal catalyst array using plasma under the hydrogen atmosphere to form catalyst nanoparticles may be performed and then a process of supplying mixed gas including a hydrogen source, a carbon source, and a hetero atom source to synthesize the doped carbon materials may be performed.

According to the exemplary embodiment of the present invention, any carbon source used when the carbon materials are synthesized is used irrespective of kind and may include, for example, methane, ethane, propane, ethylene, acetylene gas, or the like. The hetero atom source may be freely selected depending on the use purpose, physical properties, or the like of the graphene that is a final product, and in particular, preferably includes gas including the atom so that the carbon materials may be doped with at least one hetero atom selected from pentavalent elements such as nitrogen, phosphorus, arsenic, antimony, and bismuth or trivalent elements such as boron, aluminum, gallium, indium, and thallium. In more detail, the hetero atom source may be a precursor of the pentavalent elements and the trivalent elements and may include, for example, nitrogen precursors such as ammonia ($NH_3$) and nitrogen ($N_2$), sulfur precursors such as hydrogen sulfide ($H_2S$), boron precursors such as diborane ($B_2H_6$), phosphorous precursors such as phosphine ($PH_3$), or the like. Among those, at least any one or two precursors may be used.

According to the exemplary embodiment of the present invention, a mixed ratio of the hetero atom source and the hydrogen within the mixed gas may be 1:0 to 20. When the mixing ratio of the hetero atom source and the hydrogen is out of the set mixing ratio, polycrystalline carbon generated at the time of the reaction may not sufficiently be removed and therefore the growth of the carbon materials may not be smooth and the doping of the hetero atom within the carbon materials may not be smooth.

If the doped carbon materials are formed, like the step iii), the substrates may be etched with the etchant to separate the doped carbon materials. At this point, in the step iii), the substrate may be dipped into the etchant to easily etch the substrate and any etchant that may etch the substrate may be used irrespective of kind. For example, when the substrate is made of silicon or silicon dioxide, the etchant in which the hydrofluoric acid is diluted may be used.

The doped carbon materials manufactured according to the manufacturing method may be single-walled carbon nanotube, double-walled carbon nanotube, triple-walled carbon nanotube, multi-walled carbon nanotube, superfine carbon nanotube, and a mixed form thereof. In particular, the multi-walled carbon nanotube of double walls or more is preferable. In the case of the single-walled carbon nanotube, the nanotube structure may be changed during the impurity doping.

Further, the doped carbon materials manufactured according to the foregoing manufacturing method may be one doped at an element ratio that is 0.001 to 10% of hetero atom with respect to the entire carbon atom. In the range, the unzipping efficiency of the carbon materials may be improved.

In the doped carbon materials manufactured according to the exemplary embodiment of the present invention, at least one doped hetero atom may be coordinately bonded to a metal element. For example, the carbon materials (having pyridine structure) doped with nitrogen like the initiation of FIG. 2 or (i) of FIG. 3 may have the form in which the nitrogen atom is coordinately bonded to the metal element ($Fe^{2+}$). The nitrogen atom and the metal element may have the changed bonding form while the unzipping reaction is performed, such that the graphene doped with the hetero atom in the 2D form without defects may be generated.

Figure 2:
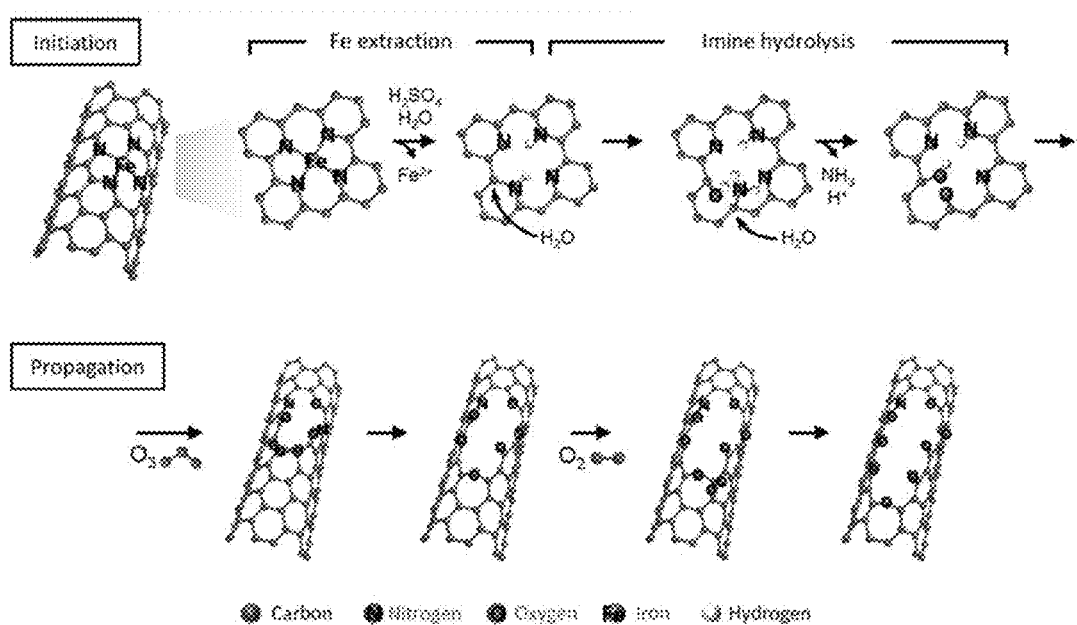
FIG. 2 is a diagram illustrating each step of the unzipping phenomenon of the multi-walled carbon nanotube doped with nitrogen according to the exemplary embodiment of the present invention.

Referring to FIGS. 2 to 4, describing in more detail, by way of example, the case in which the hetero atom doped on the carbon nanotube is nitrogen and the metal atom coordinately bonded to the nitrogen is iron, first, the nitrogen doped on the carbon nanotube may be doped in four forms of quaternary nitrogen, pyridinic nitrogen, pyrrolic nitrogen, and nitrogen oxide.

As illustrated in FIGS. 2 and 3, when the oxidizer first contacts the nitrogen-doped carbon nanotube, the iron coordinately bonded to the nitrogen is deintercalated and the nitrogen is bonded to hydrogen. Further, if the carbon bonded to the nitrogen is attacked by the oxidizer, the bonding of the nitrogen to the carbon is deintercalated while being broken and an oxygen atom is bonded to the spot. Further, the unzipping phenomenon is accelerated while being propagated to adjacent nitrogen atoms or carbon atoms.

Figure 4A:
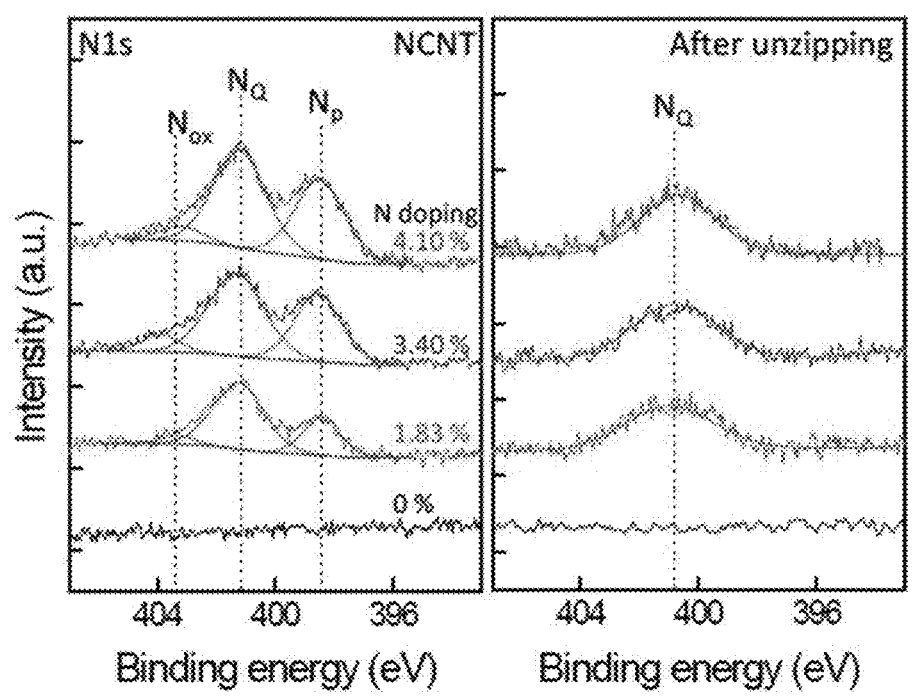
Figure 4B:
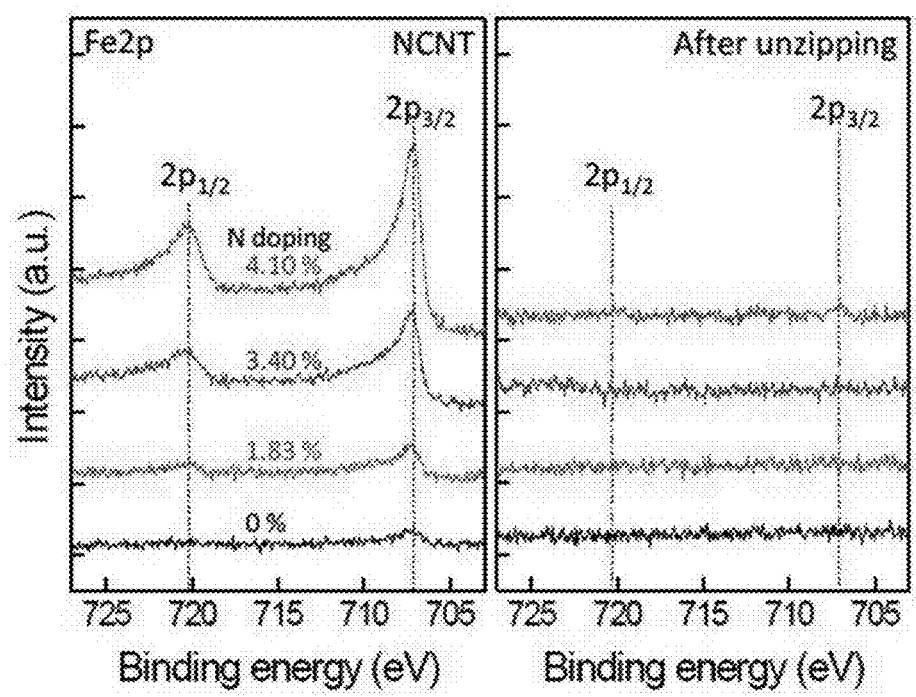

Like FIG. 4B in which the bond energy of iron is measured, the iron is bonded in a form of back coupling orbital ($2p_{1/2}$ and $2p_{3/2}$), prior to performing the unzipping phenomenon, but after the unzipping, a peak of $2p_{1/2}$ and $2p_{3/2}$ completely disappears and thus it may be appreciated that the iron is completely deintercalated while the unzipping phenomenon of the carbon nanotube is performed.

As one detailed example, any metal element that may react to the hydrogen to be deintercalated from the doped carbon materials may be used in the present invention without a limitation and an example of the metal element may include at least any one or two selected from iron (Fe), nickel (Ni), copper (Cu), tungsten (W), vanadium (V), chromium (Cr), tin (Sn), cobalt (Co), manganese (Mn), molybdenum (Mo), magnesium (Mg), aluminum (Al), silicon (Si), zirconium (Zr), titanium (Ti), ruthenium (Ru), platinum (Pt), silver (Ag), gold (Au), palladium (Pd), rhodium (Rh), iridium (Ir), tantalum (Ta), niobium (Nb), zinc (Zn), and cadmium (Cd).

In FIG. 4, the bond energy of nitrogen or iron in the nitrogen-doped carbon nanotube is confirmed by X-ray photoelectron spectroscopy (XPS) to confirm the unzipped phenomenon. Prior to performing the unzipping phenomenon as illustrated in FIG. 4A, the bonding of the nitrogen in the form of nitrogen oxide ($N_{Ox}$), quaternary nitrogen ($N_Q$), pyridinic nitrogen ($N_p$), or the like may be confirmed by the peak but after unzipping, only the quaternary nitrogen ($N_Q$) is confirmed and the peak intensity is reduced, such that it can be appreciated that the nitrogen may be deintercalated and the structure thereof may be changed.

Further, the present invention may include the graphene manufactured by the foregoing method. In more detail, the graphene may be manufactured by unzipping the doped carbon materials by the external stimulus and the graphene of which the edge includes carbonyl may be provided.

In more detail, in C1s spectrum obtained by the X-ray photoelectron spectroscopy (XPS), the graphene may satisfy the following Formulas 2 to 5.

$$0.01 \leq X_2/X_1 \leq 0.15 \quad \text{[Formula 2]}$$

$$0.01 \leq X_3/X_1 \leq 0.2 \quad \text{[Formula 3]}$$

$$0.01 \leq X_4/X_1 \leq 0.1 \quad \text{[Formula 4]}$$

$$0.5 \leq X_3/X_2 \leq 1{,}000 \quad \text{[Formula 5]}$$

(In the above Formulas 2 to 5, $X_1$ represents a peak area of carbon-carbon double bonding, $X_2$ represents a peak area of carbon-oxygen single bonding, $X_3$ represents a peak area of carbon-oxygen double bonding, and $X_4$ represents a peak area of carboxyl.)

At present, most of the methods of manufacturing graphene by an oxidation reaction form several oxygen functional groups such as epoxy, hydroxyl, carbonyl, and carboxylic acid at the surface of the graphene and the portion of the edge thereof. The group of the formed oxygen functional groups increases a repulsive force between the graphenes by a covalent bond of an organic matter to a hydrophilic functional group within a polar solvent to greatly improve dispersibility of the graphene.

However, the graphene manufactured by the existing method has a problem in that the group of the functional groups is covalently bonded to the surface of the graphene to change $sp^2$ bonding to $sp^3$ bonding to thereby greatly reduce the electric conductivity of the graphene. That is, the groups of the functional groups present on the surface of the graphene act as the defects to reduce the unique electric conductivity of the graphene.

The graphene manufactured according to the exemplary embodiment of the present invention is to solve the above disadvantage. Here, the edge of the manufactured graphene may be formed with the carbonyl to improve the dispersibility due to the electrostatic repulsive force between the carbonyls and the manufactured graphene may suppress the unnecessary functional group that may be formed on the surface of the graphene, or the like besides the carbonyl at the edge of the graphene to maintain the unique electric conductivity of the graphene.

In the present invention, the above Formulas 2 to 5 digitize various oxygen functional groups, or the like such as epoxy, hydroxyl and carboxylic acid. Describing in detail it with reference to FIG. 5, in the above Formulas 2 to 5, $X_1$ to $X_4$ each represent peak areas of carbon-carbon double bonding (C=C bonding, 284.5 eV, $X_1$), carbon-oxygen single bonding (C—O bonding, 286.5 eV, $X_2$), carbon-oxygen double bonding (C=O bonding, 287.75 eV, $X_3$), and carboxyl (COOH, 288.75 eV, $X_4$). That is, as described above, when the peak area ratio of the oxygen functional group to the carbon-carbon double bonding (C=C) present within the graphene is satisfied, the unnecessary reaction group that may be generated on the surface of the graphene such as epoxy (indirectly confirmed through the C—O peak) group is not present, and as a result it may be confirmed that the graphene having good crystallinity is manufactured.

In more detail, the above Formulas 2 to 5 according to the exemplary embodiment of the present invention may satisfy the following range.

$X_2/X_1 \leq 0.07$ [Formula 2]

$0.05 \leq X_3/X_1 \leq 0.17$ [Formula 3]

$X_4/X_1 \leq 0.05$ [Formula 4]

$1.0 \leq X_3/X_2$ [Formula 5]

The edge of the graphene manufactured according to the exemplary embodiment of the present invention may be formed with the carbonyl (C=O). In more detail, in the quadrangular graphene, the edge formed by doping the nitrogen and then performing the unzipping by the oxidation reaction may be formed with the carbonyl. As a result, it is possible to improve the dispersibility of the graphene while maintaining the unique electric conductivity of the graphene. Further, the functional graphene derivative may be easily manufactured using the introduced carbonyl without changing the chemical structure of the graphene.

Further, the graphene manufactured according to the exemplary embodiment of the present invention may satisfy the electrochemical physical properties to apply to various fields such as a field effect transistor (FET), a supercapacitor, a hydrogen generation/storage, a solar cell, a photocatalyst, and a biosensor, and in particular, may have a wide surface area and strong electrical connectivity to apply to an ultra-high power supercapacitor.

Hereinafter, the present invention will be described in more detail with reference to the following examples. However, the following examples are only an example of several embodiments of the present invention and therefore the present invention is not limited to the following examples.

(Characteristics)

The carbon nanotube or the graphene manufactured according to the following manufacturing examples, examples, and comparative examples was photographed by a transmission electron microscope (double-aberration corrected HR-TEM (Titan G2 60-300) of FEI Co.), field emission scanning electron microscope (Magellan400 of FEI Co.), atomic force microscopy (MultiMode 8 of Bruker Co.), Raman spectra (ARAMIS of Horiba Jobin Yvon Co.), and XPS spectra (Sigma probe of Thermo VG Scientific Co.), or the like.

(Electrical Characteristics)

As the electrochemical characteristics, potentiostat (Biologic, SP-200) was used and as the electrolyte, 1 M of potassium hydroxide (KOH) was used.

Electrochemical impedance spectroscopy (EIS) used 10 mV of AC current and a frequency range of an AC current signal is 10 mHz to 1 MHz.

MANUFACTURING EXAMPLE (a) Manufacturing of Nitrogen-doped Carbon Nanotube
PS-b-PMMA[polystyrene-block-poly(methylmethacrylate)] having a weight-average molecular weight of 140,000 (PS)-65,000 (PMMA) is deposited on the silicon substrate to form a PS-b-PMMA film and then the film is annealed at a temperature of 250° C., thereby forming the block copolymer having a self-assembling nanostructure having a vertical cylinder form. The PMMA that is the block forming the vertical cylinder was selectively removed by the wet etching and the UV irradiation to manufacture the PS nanotemplate having nanopores. At this time, a diameter of the nanopore of the PS nanotemplate was 21 nm and a central distance between the peripheral pores was 35 nm.

Next, as a metal mask was placed on the nanotemplate within an evaporator (Atech system, Korea) by using the vacuum deposition and the Fe that is the metal catalyst is deposited on the PS nanotemplate, the Fe that is the metal catalyst was selectively deposited on the portion that is not covered with the metal mask.

The PS nanotemplate was removed from the substrate deposited with the metal catalyst by the toluene sonication to acquire a hierarchically patterned Fe array from multiple length scales. The Fe array was heat treated at a temperature of 600° C. and the ammonia gas and the hydrogen gas were injected at a flow velocity of 100 sccm while being continuously mixed at a ratio of 4:1 (v/v) and thus the carbon nanotube was grown by the PECVD, thereby acquiring the nitrogen-doped carbon nanotube (NCNT) array.

(b) Manufacturing of Graphene Using Nitrogen-doped Carbon Nanotube

To etch the substrate on which the NCNT is grown, the silicon substrate was etched by being dipped into the etchant in which the hydrofluoric acid is diluted to separate the NCNT from the substrate. Next, a glassy carbon electrode was dipped into the etchant to attach the NCNT to the electrode, thereby acquiring the NCNT. Further, to improve the mechanical and electrical adhesion between the electrode and the NCNT, the electrode was taken out and heat-treated at 65° C. for 12 hours.

The heat-treated electrode was installed in the 3-electrode system (counter electrode: Pt wire, reference electrode: mercury/mercury (II) sulfate) as a working electrode and a voltage was supplied to a DC power supplier through 1 M of sulfuric acid solution as the electrolyte to perform the oxidation reaction of the NCNT. However, prior to performing the oxidation reaction, the pure nitrogen gas is purged in the electrolyte for 10 minutes or more.

Examples 1 to 3

The graphene was manufactured by changing the oxidation reaction passage time of the NCNT. First, the graphene was manufactured by the same method as the manufacturing example, as the oxidation reaction condition, 1 M of sulfuric acid solution was used as the electrolyte, and a voltage of 0.8 V was supplied to the DC power supplier. Further, it was confirmed how much the oxidation reaction of the graphene is progressed by the transmission electron microscope per 2 (Example 1), 8 (Example 2), and 16 (Example 3) hours and the atom composition of the graphene and the bonding state of electrons were confirmed by the X-ray photoelectron spectroscopy (XPS).

Comparative Example 1

Except that the nitrogen atom is not doped at all, the carbon nanotube was manufactured by the same method as Example 1 to perform the oxidation reaction of the graphene under the same conditions.

Figure 7A:
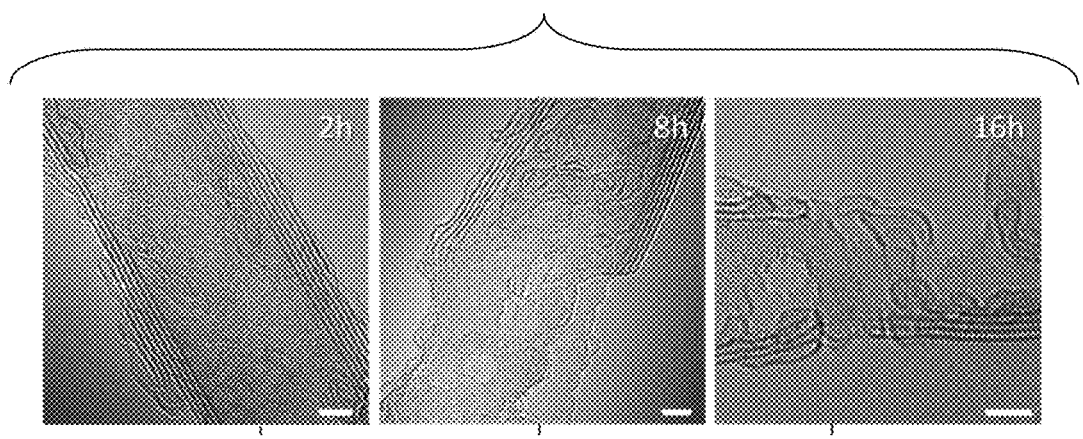

As illustrated in FIG. 7A, it could be appreciated that when the oxidation reaction time passes two hours, an outermost wall of the NCNT is selectively decomposed and when 8 hours elapse, most of the NCNT walls are unfolded. Further, it could be appreciated that when 16 hours elapse, the NCNT is completely decomposed into a graphene flake. In particular, it could be appreciated that even after the oxidation reaction time passes 16 hours, the surface of the graphene having a complete hexagonal crystal form is maintained and thus even when the oxidation reaction is progressed, the $sp^2$ bonding of the graphene is not damaged.

Figure 7B:
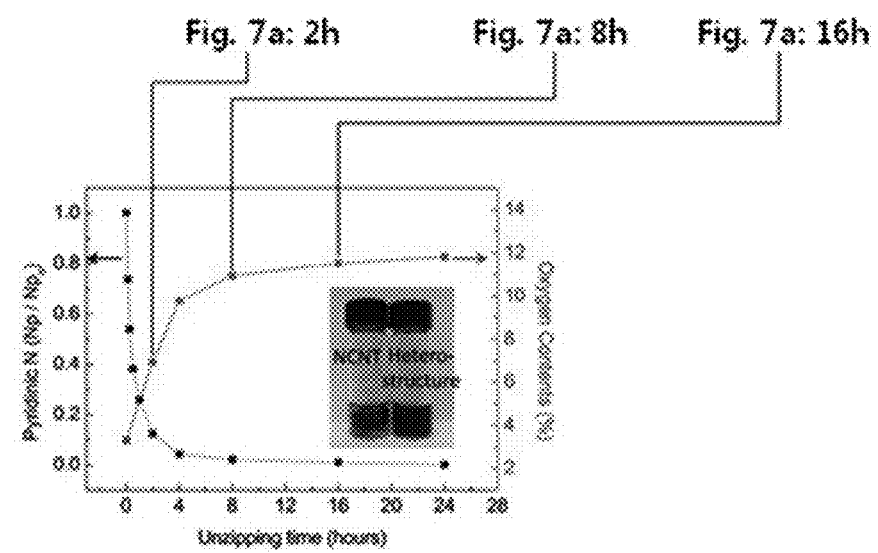

Further, as illustrated in FIG. 7B, it could be appreciated that the pyridine structure is gradually reduced within the NCNT and at the same time the content of the oxygen is gradually increased, while the oxidation reaction is performed and thus the selective unfolding phenomenon occurs in the pyridine structure within the NCNT by the oxidation reaction and the nitrogen is slowly dropped in the pyridine structure and at the same time the nitrogen is substituted into the oxygen functional group.

Further, it could be appreciated that the oxidation reaction rate is suddenly increased from the beginning of the oxidation reaction to the passage of 8 hours and the oxidation reaction rate is suddenly reduced at 8 hours as a boundary of the reaction time and then the oxidation reaction rate approaches almost 0% at 16 hours.

Figure 7C:
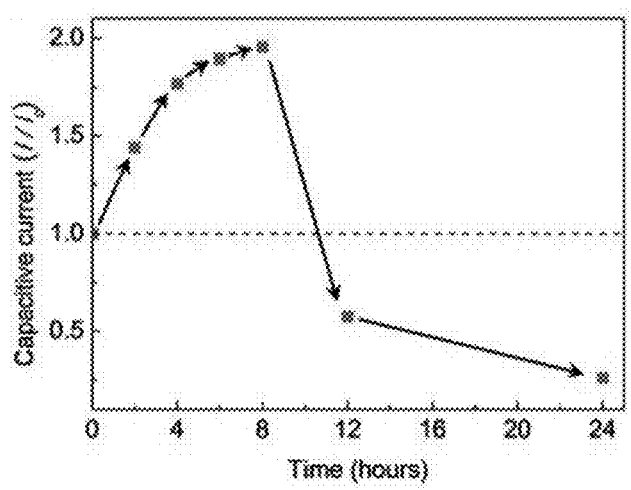

FIG. 7C illustrates a measurement of a capacitive current ($I_C$) over the oxidation reaction time, in which it could be appreciated that the capacitive current ($I_C$) is suddenly increased from the beginning of the first oxidation reaction to the passage of four hours, reaches a top point up to 8 hours, and then is suddenly reduced. It could be appreciated that as the first oxidation reaction is performed, the surface area is increased while the outermost wall of the NCNT is released and thus the $I_C$ is increased and when the oxidation reaction time passes 8 hours, the inner wall of the NCNT is also released and thus the $I_C$ is gradually suddenly reduced at the top point. The reduction in electrical properties depends on the self ending of the oxidation reaction of the NCNT.

Figure 5:
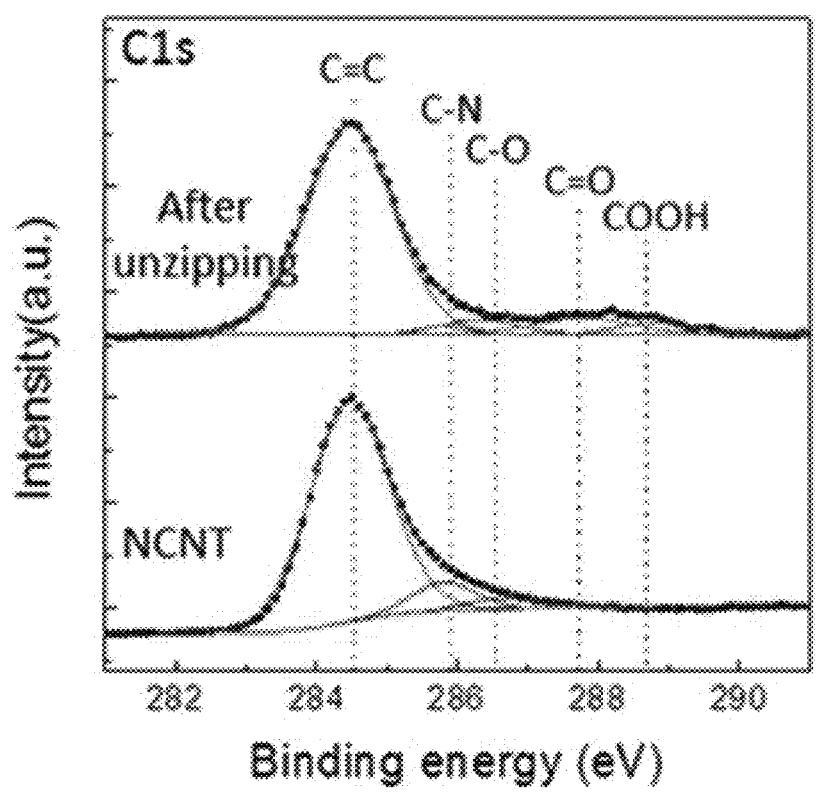
FIG. 5 is a diagram illustrating an XPS graph of the nitrogen-doped carbon nanotube (NCNT) and the graphene after unzipping according to the exemplary embodiment of the present invention.
Figure 6:
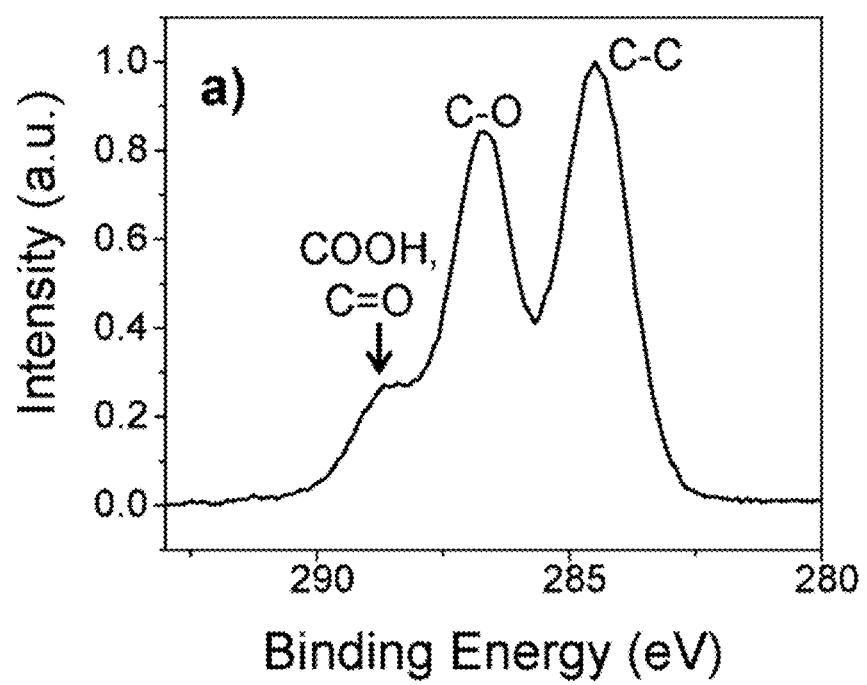
FIG. 6 is a diagram illustrating an XPS graph of multi-walled carbon nanotube (MWCNT) after oxidation according to Comparative Example.

FIGS. 5 and 6 illustrate the XPS graph of the graphene manufactured according to the above Example 3 and the above Comparative Example 1. As illustrated in FIG. 5, it could be appreciated that in the graphene manufactured according to the present invention, the epoxy (C—O) group and the carboxyl (COOH) group are little increased before the oxidation reaction is performed, that is, at the time of compared with the nitrogen-doped carbon nanotube. In particular, when the peak areas are measured after the oxidation reaction ends, the peak areas each are 1.568 (peak area of carbon-carbon double bonding, $X_1$), 0.095 (peak area of carbon-oxygen single bonding, $X_2$), 0.136 (peak area of carbon-oxygen double bonding, $X_3$), and 0.070 (peak area of carboxyl, $X_4$) and when the peak areas are substituted into the above Equations 2 to 5, $X_2/X_1=0.061$, $X_3/X_1=0.087$, $X_4/X_1=0.045$, $X_3/X_2=1.432$, such that it could be appreciated that the carbonyl (C=O) is slightly increased and thus the edge of the generated graphene is formed with the carbonyl.

In contrast, referring to FIG. 6 illustrating the XPS graph of the above Comparative Example 1, it could be appreciated that only the carbon-carbon bonding was measured before the oxidation reaction is performed, but the epoxy, the carbonyl, and the carboxyl are generated in large quantities besides the carbon-carbon bonding after the oxidation reaction is performed. In particular, when the peak areas are measured after the oxidation reaction ends, the peak areas each are 1.75 (peak area of carbon-carbon double bonding, $X_1$), 1.414 (peak area of carbon-oxygen single bonding, $X_2$), 0.282 (peak area of carbon-oxygen double bonding, $X_3$), and 0.282 (peak area of carboxyl, $X_4$) and when the peak areas are substituted into the above Equations 2 to 5, $X_2/X_1=0.808$, $X_3/X_1=0.161$, $X_4/X_1=0.161$, $X_3/X_2=0.199$, such that it could be appreciated that a value even larger than the range of the Example appears, or the epoxy is much more generated than the carbonyl and thus a value even smaller than the Example appears (Formula 5). It could be appreciated that when the oxidation reaction is performed using the oxidizer like the existing method, besides the carbonyl, a lot of unnecessary functional groups such as the epoxy are generated at the edge and on the surface of the graphene.

Examples 4 to 6

At the time of manufacturing the NCNT, the NCNT was manufactured by changing the amount of doped nitrogen atom. First, the graphene was manufactured by the same method as the manufacturing example and the amount of doped nitrogen atom was adjusted to element ratios of 1.75% (Example 4), 2.65% (Example 5), and 3.94% (Example 6), respectively, with respect to the entire carbon atom. In addition, as the oxidation reaction condition, 1 M of sulfuric acid solution was used as the electrolyte and a voltage of 0.8 V (vs. MMS) was supplied to the DC power supplier. Further, after the oxidation reaction is performed for 8 hours, it was confirmed how much the oxidation reaction of the graphene is progressed by the transmission electron microscope.

Figure 8:
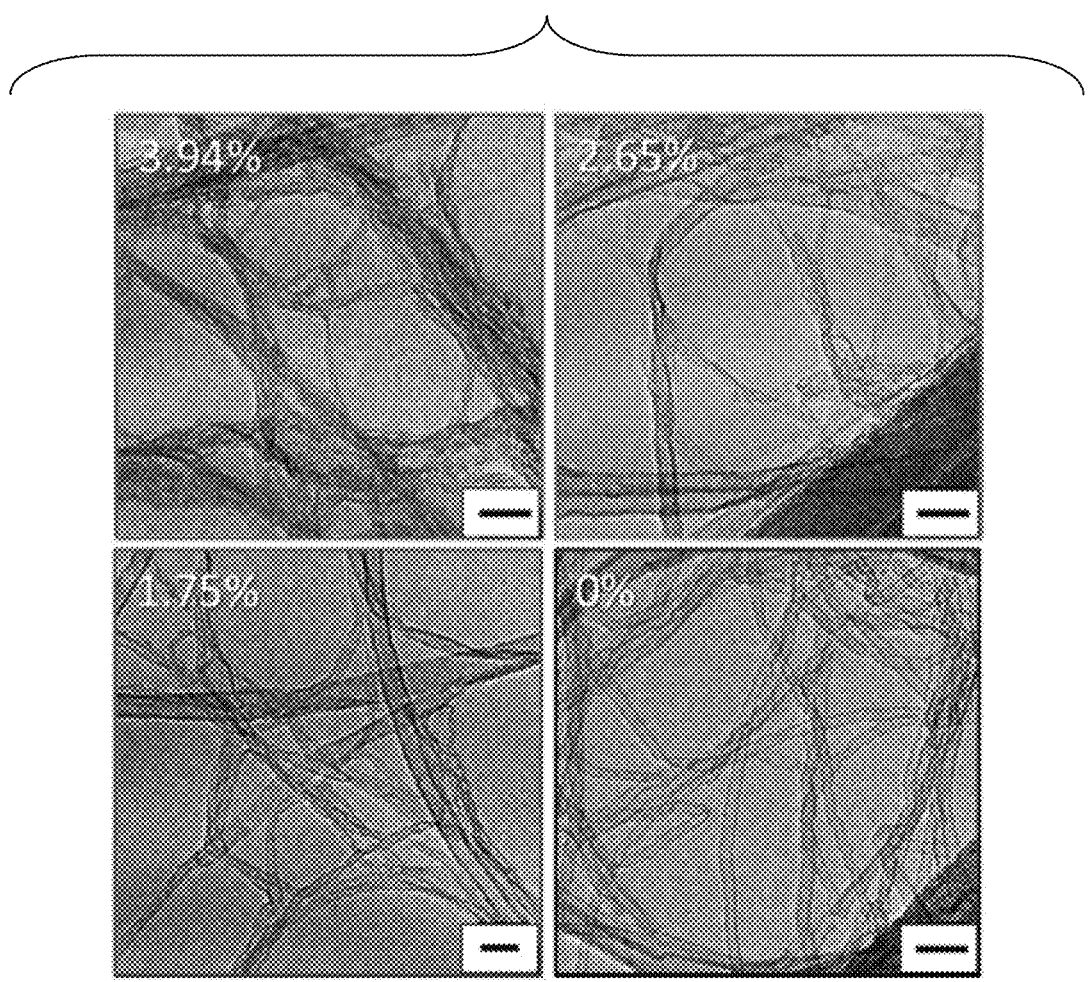
FIG. 8 is a diagram illustrating, by the TEM, how much the unzipping phenomenon depending on a nitrogen doping quantity of the multi-walled carbon nanotube doped with nitrogen is performed, in which a scale bar is 20 nm.

As illustrated in the right of FIG. 8, it could be appreciated that as the amount of doped nitrogen atom is increased, the unfolded extent of the NCNT is increased. On the other hand, in the case (right lower of FIG. 7) of the Comparative Example 1 in which the nitrogen is not doped at all, it could be appreciated that the unfolding of the carbon nanotube is not generated at all and thus the doping of the nitrogen atom has a big effect on the unfolding phenomenon of the graphene of the carbon nanotube.

Examples 7 to 12

The graphene was manufactured by changing the amount of applied voltage when the oxidation reaction of the NCNT is performed. First, the graphene was manufactured by the same method as the manufacturing example and power was supplied to the DC power supplier, but the applied voltage was adjusted to 0.5 V (Example 7), 0.6 V (Example 8), 0.7 V (Example 9), 0.8 V (Example 10), 0.9 V (Example 11), and 1.0 V (Example 12, vs. MMS), respectively. In addition, as the oxidation reaction condition, 1 M of sulfuric acid solution was used as the electrolyte. Further, after the oxidation reaction is performed for 8 hours, it was confirmed how much the oxidation reaction of the graphene is progressed by the transmission electron microscope.

Comparative Examples 2 and 3

The carbon nanotube in which the nitrogen atom is not doped at all was manufactured like the above Comparative Example 1 and except for applying 0.8 V (Comparative Example 2) and 1.0 V (Comparative Example 3) as the applied voltage, other conditions were maintained as before to perform the oxidation reaction of the graphene.

Figure 9:
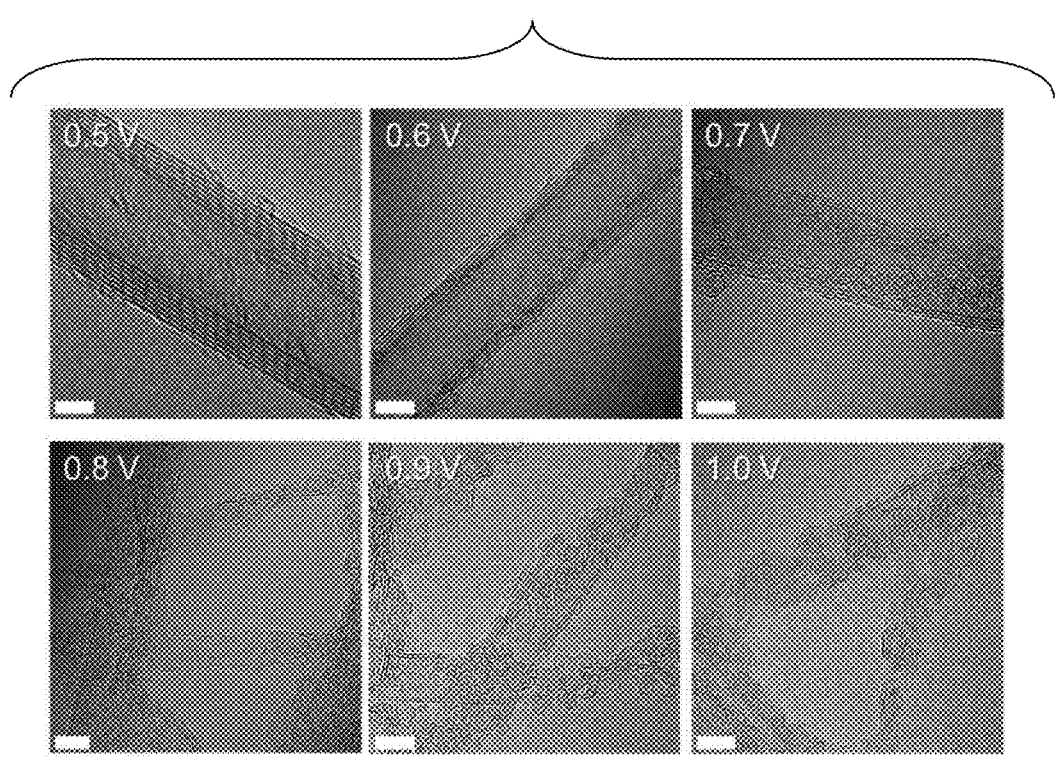
FIG. 9 is a diagram illustrating, by the TEM, how much the unzipping phenomenon depending on a voltage applying quantity of the multi-walled carbon nanotube doped with nitrogen is performed, in which a scale bar is 5 nm.

As illustrated in FIG. 9, the NCNT suffered from the unzipping phenomenon at an applied voltage of 0.6 V and the phenomenon was continued up to 0.8 V. However, it could be appreciated that when a voltage of 0.9 V or more is applied, the random unzipping phenomenon occurs and an unnecessary damage occurs on the surface of the graphene.

Figure 10:
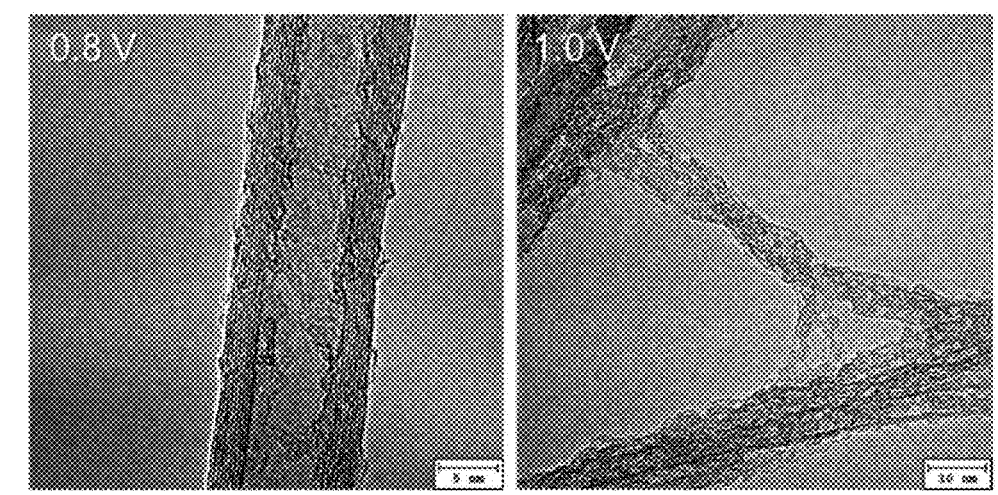
FIG. 10 is a diagram illustrating, by the TEM, how much the unzipping phenomenon depending on a voltage applying quantity of the typical multi-walled carbon nanotube is performed.

On the other hand, in the case of FIG. 10, the unfolding phenomenon of the carbon nanotube is not generated at all at an applied voltage of 0.8 V. Further, it could be appreciated that when the applied voltage is 1.0 V, the $sp^2$ bonding between the carbon atoms is randomly broken, and thus the carbon nanotube having the multi-walled structure is completely broken and the torn graphene is generated.

That is, when the carbon nanotube is doped with the hetero atom like the present invention, the doped hetero atom meets the oxidizer to break the bonding, such that the unfolded graphene may be obtained while maintaining the uniform form in 2D. On the other hand, it could be appreciated that when the hetero atom is not doped, the unzipping phenomenon of the carbon nanotube is not performed at all or the bonding between the carbon atoms is simultaneously broken due to the excessive voltage, and thus the graphene never maintains the 2D structure.

Examples 13 and 14

The oxidized NCNT was manufactured by the same method as the manufacturing example and the oxidation time was performed short as 1 hour.

Figure 13:
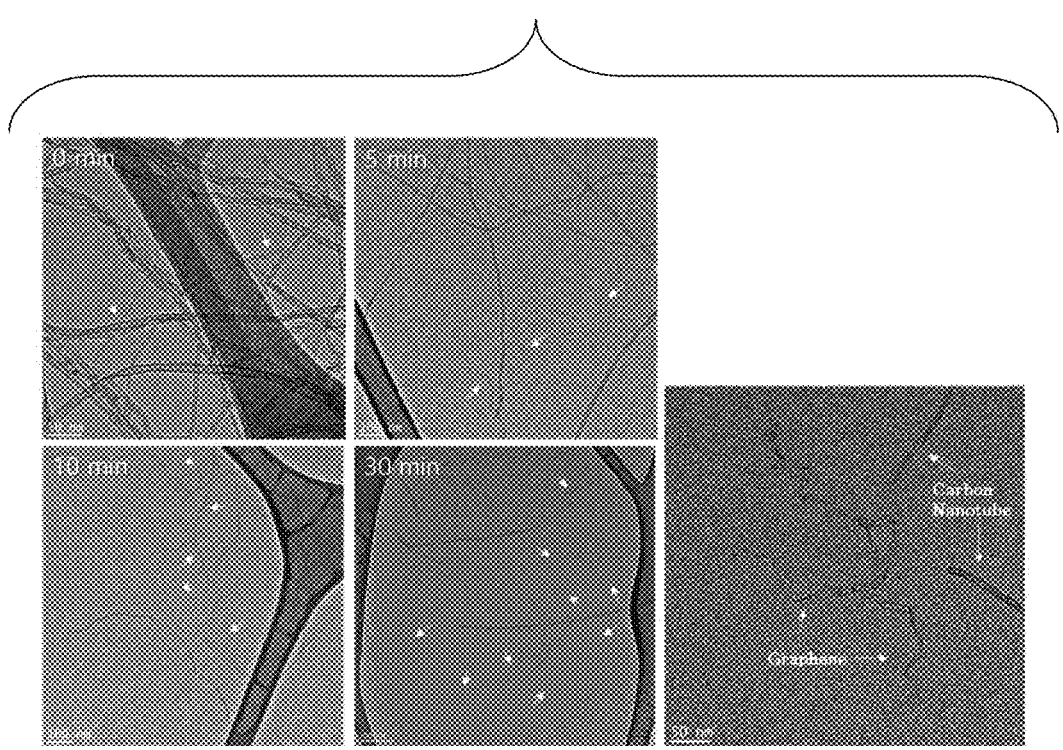
FIG. 13 is a diagram illustrating, by the TEM, how much the unzipping phenomenon over sonication time of the multi-walled carbon nanotube doped with nitrogen according to the exemplary embodiment of the present invention is performed.
Figure 14:
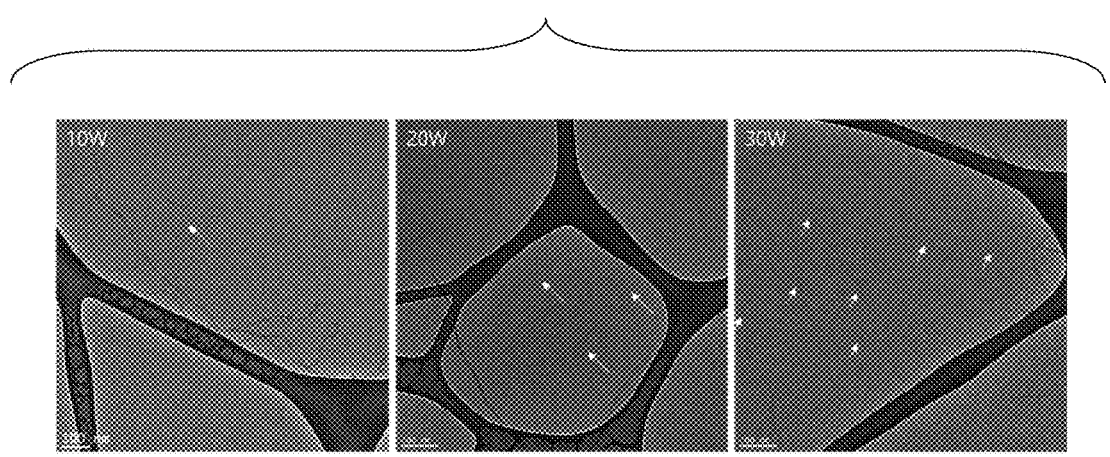
FIG. 14 is a diagram illustrating, by the TEM, how much the unzipping phenomenon depending on a sonication output of the multi-walled carbon nanotube doped with nitrogen according to the exemplary embodiment of the present invention is performed.

Next, the sonication was applied to the oxidized NCNT to manufacture the graphene and the oxidized NCNT was dispersed in N-methyl-2-pyrrolidone and the sonication was applied to manufacture the graphene and the graphene was manufactured by changing the sonication processing time (Example 13) and the power (Example 14). FIGS. 13 and 14 illustrate the manufactured graphene observed using the transmission electron microscope. At this time, in Example 13, the power is fixed to 10 W and in Example 14, the time was fixed to 30 minutes.

As illustrated in FIG. 13, it could be confirmed that as the processing time is long, the manufacturing efficiency of the graphene is improved and as illustrated in FIG. 14, it could be confirmed that as the power is strong, the unzipping phenomenon is effectively generated.

Example 15

To confirm electrochemical characteristics of an AC-line filtering double layer capacitor, the graphene hetero structure that suffers from the oxidation reaction was applied as the electrode material. The electrode was manufactured by coating a platinum foil with the graphene hetero structure that suffers from the oxidation reaction and did not include other binders or additives at the time of the manufacturing of the electrode and the electrode material was electrochemically reduced at −0.6 V for 30 minutes to remove the unnecessary oxygen functional group.

The two symmetrical electrodes including the platinum foil were prepared and the capacitor cell composed of 1.0 M of potassium hydroxide (KOH) solution was manufactured. Further, the scan rates each were 1 V/s, 10 V/s, 100 V/s, and 400 V/s and analyzed by the cyclic voltammetry (CV).

Figure 11:
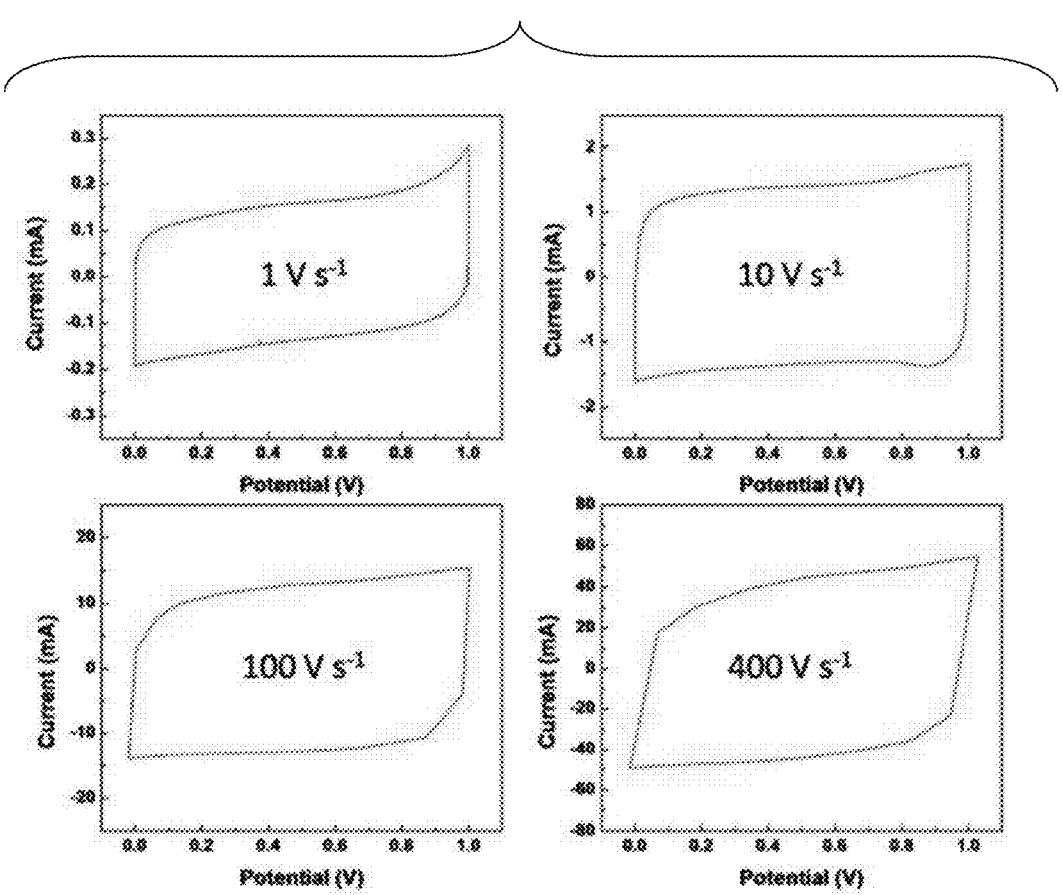
FIG. 11 is a graph illustrating cyclic voltammetry (CV) depending on scan rates of a capacitor manufactured according to an exemplary embodiment of the present invention.

As illustrated in FIG. 11, the CV curve maintained a rectangular form at various scan rates and maintained the rectangular form even at a very high scan rate of 400 V/s. It could be appreciated that the electrode including the graphene hetero structure according to the present invention has a fast charge movement and a low equivalent serial resistance and the capacitor having a general electrical double layer form has a substantially ideal CV curve form.

Examples 16 and 17

Figure 12:
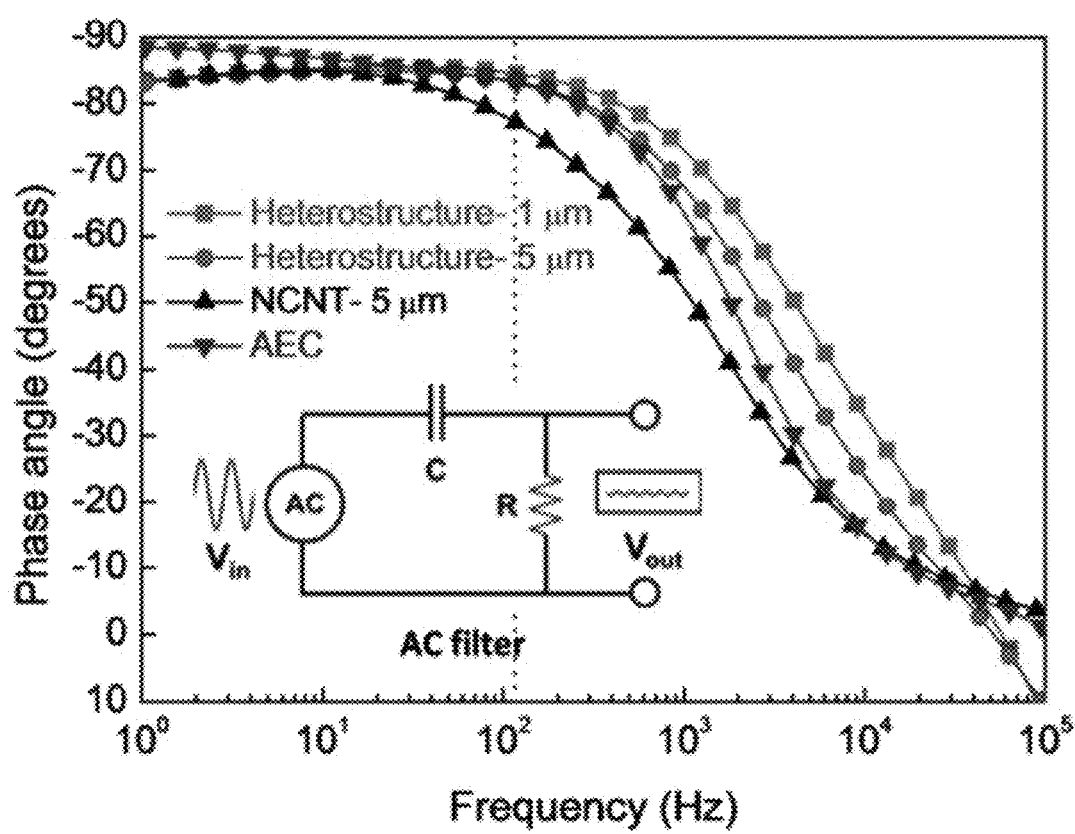
FIG. 12 is a diagram illustrating impedance phase angles depending on a frequency of the capacitor manufactured according to the exemplary embodiment of the present invention.

To figure out impedance phase angles at various frequencies, the capacitor was manufactured using a graphene hetero structure thin film having height 1 μm (Example 16), height 5 μm (Example 17) as the electrode. FIG. 12 illustrates the impedance phase angles measured depending on the frequency of the manufactured capacitor.

Comparative Examples 4 and 5

The impedance phase angles were measured using the nitrogen-doped carbon nanotube (Comparative Example 4) having a height of 5 μm as the electrode of the capacitor and a general aluminum electrolyte capacitor (Comparative Example 5, AEC 10 V/220 μF), which was illustrated in FIG. 11.

As illustrated in FIG. 12, the capacitor including the graphene hetero structure according to the present invention has a phase angle of −45° in frequency 8.15 kHz (Example 16) and frequency 5.32 kHz (Example 17), which was confirmed as having much more excellent properties than the nitrogen-doped carbon nanotube (Example 4) that does not suffer from the oxidation reaction and the general aluminum electrolyte capacitor (Comparative Example 5).

Further, the capacitor of Example 14 has substantially a phase angle of −85° at frequency 120 Hz and thus was shown as having much more excellent phase angle than the nitrogen-doped carbon nanotube of the Comparative Example 4 and having a value substantially equal to the general aluminum electrolyte capacitor. On the other hand, the Comparative Example 4 recorded a phase angle of −78° at the same frequency, which seems to happen due to the increase in ionic dispersion distance and the increase in electrical resistance.

The graphene manufactured according to the exemplary embodiment of the present invention may have the hetero structure unfolded in the form in which it encloses the carbon material, in more detail, the carbon nanotube (CNT) core to maintain the complete two-dimensional crystallinity, may maintain the borders of the unfolded graphene well without the physical or chemical damage, and may not generate the unnecessary oxygen functional groups such as epoxy, hydroxy, and carboxy to maintain electric conductivity higher than that of the graphene nanoribbon of the existing manufacturing method.

Further, the graphene manufactured according to the exemplary embodiment of the present invention may have the structure of the heterogeneous structure of the graphene/carbon nanotube and the graphene nanoribbon/carbon nanotube, thereby satisfying both of the excellent specific surface area that is the advantage of the graphene and the high electric conductivity that is the advantage of the carbon nanotube.

In addition, the method according to the exemplary embodiment of the present invention may not manufacture the graphene having the typical structure but manufacture graphene of which the borders are introduced with the carbonyl, and may easily manufacture the functional graphene derivative using the introduced carbonyl without changing the graphene chemical structure.

Hereinabove, the specific portion of the present invention is specifically described but it is apparent to those skilled in the art that the detailed description is only a preferable embodiment and does not limit the scope of the present invention. Therefore, the substantial scope of the present invention is defined by the appending claims and equivalents thereto.

What is claimed is:

1. A method of manufacturing graphene comprising:
   i) depositing a metal catalyst on a substrate;
   ii) after step i), growing doped carbon materials on the metal catalyst;
   iii) after step ii), etching the substrate with an etchant to separate the doped carbon materials;
   iv) after step iii), transferring the doped carbon materials to an electrode and then heat-treating the electrode to attach the doped carbon materials to the electrode; and
   v) after step iv), putting the electrode, to which the doped carbon materials are attached, in an electrolyte including an oxidizer and applying a voltage to the electrode to perform an oxidation reaction,
   wherein the graphene has an edge formed with carbonyl and satisfies the following Formulas 2 to 5 in C1s spectrum obtained by an X-ray photoelectron spectroscopy (XPS):

$$0.01 \leq X_2/X_1 \leq 0.15 \quad \text{[Formula 2]}$$

$$0.01 \leq X_3/X_1 \leq 0.2 \quad \text{[Formula 3]}$$

$$0.01 \leq X_4/X_1 \leq 0.1 \quad \text{[Formula 4]}$$

$$0.5 \leq X_3/X_2 \leq 1,000 \quad \text{[Formula 5]}$$

wherein $X_1$ represents a peak area of carbon-carbon double bonding, $X_2$ represents a peak area of carbon-oxygen single bonding, $X_3$ represents a peak area of carbon-oxygen double bonding, and $X_4$ represents a peak area of a carboxyl.

2. The method of claim 1, wherein the oxidizer is at least any one or two selected from sulfuric acid, nitric acid, phosphoric acid, hydrochloric acid, hydrofluoric acid, salts thereof, and an aqueous solution thereof.

3. The method of claim 1, wherein the voltage ranges from 0.01 to 5.0 V.

4. The method of claim 1, wherein the method further includes:
   vi) applying a physical external stimulus to the oxidized carbon materials after step v).

5. The method of claim 2, wherein the oxidizer is sulfuric acid or sulfuric acid solution.

6. The method of claim 5, wherein a concentration of the sulfuric acid solution ranges from 0.001 to 10 M.

7. The method of claim 1, wherein the doped carbon materials are doped with a hetero atom of at least any one selected from nitrogen, phosphorus, arsenic, antimony, bismuth, boron, aluminum, gallium, indium, and thallium.

8. The method of claim 7, wherein the hetero atom doped on the doped carbon materials is coordinately bonded to at least one metal element.

9. The method of claim 8, wherein the at least one metal element is at least any one or two selected from Fe, Ni, Cu, W, V, Cr, Sn, Co, Mn, Mo, Mg, Al, Si, Zr, Ti, Ru, Pt, Ag, Au, Pd, Rh, Ir, Ta, Nb, Zn, and Cd.

10. The method of claim 7, wherein the doped carbon materials are doped at an element ratio that is 0.001 to 10% of the hetero atom with respect to the entire carbon atom.

11. The method of claim 1, wherein the doped carbon materials are at least any one or two selected from single-walled carbon nanotube, double-walled carbon nanotube, triple-walled carbon nanotube, multi-walled carbon nanotube, and superfine carbon nanotube.

12. The method of claim 1, wherein the substrate is made of silicon or silicon dioxide.

* * * * *